S. A. SHERMAN & J. STIVESON.
TIRE.
APPLICATION FILED MAR. 30, 1914.
1,120,552.
Patented Dec. 8, 1914.
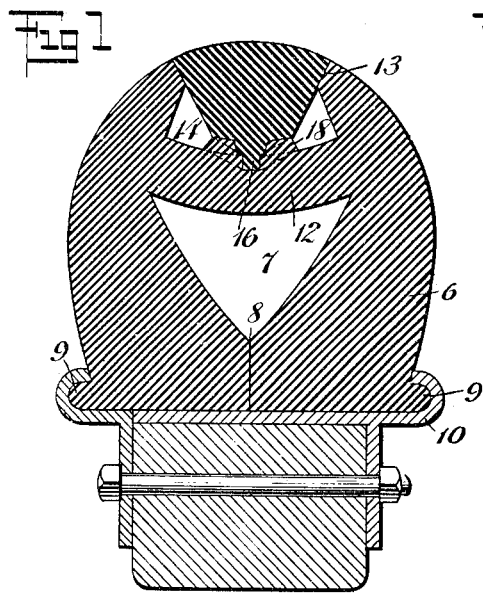
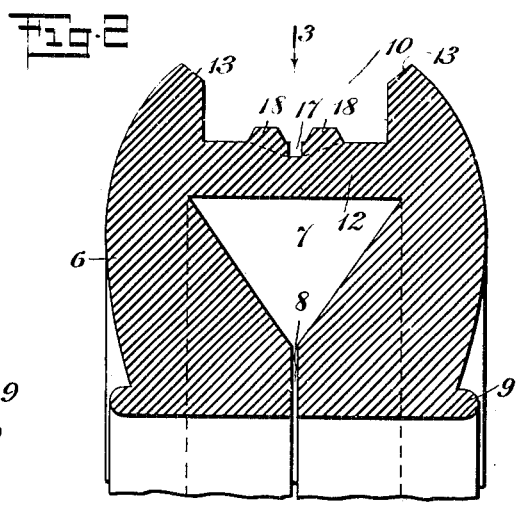
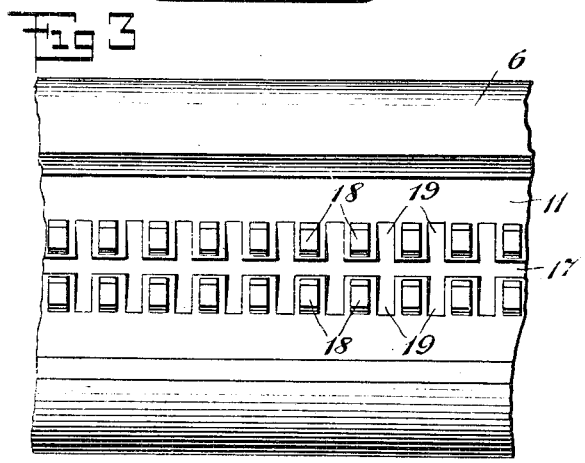
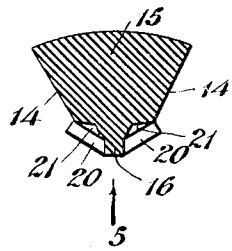
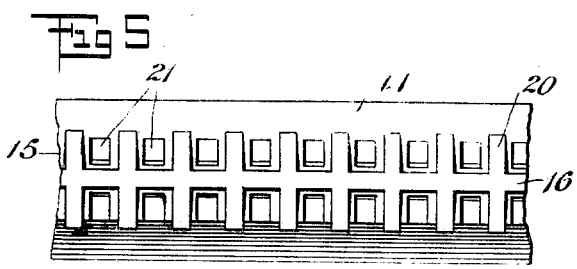
WITNESSES
INVENTORS
Simon A. Sherman
John Stiveson
BY
ATTORNEYS

UNITED STATES PATENT OFFICE.

SIMON A. SHERMAN AND JOHN STIVESON, OF YOUNGSTOWN, OHIO.

TIRE.

1,120,552. Specification of Letters Patent. Patented Dec. 8, 1914.

Application filed March 30, 1914. Serial No. 828,240.

*To all whom it may concern:*

Be it known that we, SIMON A. SHERMAN and JOHN STIVESON, citizens of the United States, and residents of Youngstown, in the county of Mahoning and State of Ohio, have invented a new and Improved Tire, of which the following is a full, clear, and exact description.

Our invention relates to a tire having a removable wearing tread.

The object thereof is to provide a simple, inexpensive and durable tire having a removable tread which can be easily and quickly replaced and which is maintained in proper position on the tire by the resiliency thereof and the pressure applied to the tread. We obtain this object by the structure illustrated in the accompanying drawings forming a part of the specification, in which similar characters of reference indicate corresponding parts in all the views and wherein—

Figure 1 is a cross section of a tire embodying our invention; Fig. 2 is a similar section of the tire showing it with the tread removed and out of the rim; Fig. 3 is a plan view of a fragment of the tire in the direction of the arrow 3, shown in Fig. 2; Fig. 4 is a cross section of the tread; and Fig. 5 is a plan view on the tread in the direction of the arrow 5, shown in Fig. 4.

Referring to the drawings, 6 represents a tire which is centrally hollowed out as indicated at 7, the hollow in cross section being preferably triangular in shape, one apex of which is adjacent to the inner periphery of the tire. The tire is preferably slit centrally, as indicated at 8, the slit extending from the inner periphery to the adjacent apex of the hollow 7. This slit permits the formation of the hollow 7 and also facilitates the engagement of the beads 9 of the tire with the rim 10 of the wheel. The tire 6 is also provided with a central annular recess 11 provided on the outer periphery thereof, said recess having preferably a rectangular cross section which is spaced from the annular hollow 7 of the tire by the solid portion 12 of the tire, forming a bridge between the recess 11 and the annular opening 7. The edges of the tire, adjacent to the upper portion of said recess are beveled, as shown at 13, so as to engage the beveled sides 14 of the annular tread 15 when said tread 15 is forced into the recess 11.

The sides 14 of the tread 15 converge toward the inner periphery thereof, whereat the said tread is centrally provided with an annular projection 16 adapted to fit snugly into an annular groove 17 provided in the central portion of the bottom of the recess 11. A plurality of spaced pairs of facing projections 18 are provided on each side of the groove 17 at the bottom of the recess 11. Between the spaced projections 18, notches 19 are formed, which extend from the bottom of the recess 11 to the bottom of the groove 17, the recesses being at each side of the groove and facing each other. Therefore, it may be said that the projections 18 and the notches 19 alternate with each other on each side of the groove 17. The tread 15 adjacent to the annular projection 16 is provided with a series of projections 20 at each side of the annular projection, which are adapted to fit into the notches 19; while the recesses formed by these projections 20 at each side of the projections 16 are properly undercut, as shown at 21, so as to fit snugly over the projections 18. The projections 20 engaging the notches 19 and the projections 18 engaging the undercut portions 21 prevent the tread 15 from sliding in the recess 11, said projections, recesses and undercuts interlocking each other as stated.

The tread 15, which is preferably formed of solid rubber, has the diameter of its inner periphery smaller than the diameter of the periphery at the bottom of the recess 11. Therefore, when said tread is fitted into the recess 11 of the tire it contracts the portion 12, as shown in Fig. 1, thus bringing the beveled edges 13 of the tire at the top of the recess against the converging sides 14 of the tread. Additional pressure on the tread will force the beveled edges 13 of the tire against the sides thereof, thereby increasing the binding action between said tire and tread. The slipping of the tread in the recess 11 is prevented by the engagement of the projections 18 and 20 with the notches 19 and undercuts 20 respectively, as previously stated.

Having thus described our invention, we claim as new and desire to secure by Letters Patent:

1. A hollow tire having an annular recess on the outer periphery separated from the hollow by a flexible bridge; an annular tread removably associated with the recess, the inner circumference of the tread being smaller than the outer circumference of the bridge, whereby said tread contracts the bridge when fitted into the recess, whereby the sides of the recess, due to the contraction of the bridge, are forced against the sides of the tread and clamp the tread in the recess, said tread and side of recess being so formed that when the tread is engaged in the recess annular spaces are formed on each side of the tread in the recess, said bridge and tread having interlocking means whereby the tread is prevented from slipping on the bridge in the recess.

2. A rubber hollow tire having an annular recess on the outer periphery separated from the hollow by a bridge, said recess being rectangular in cross section with the outer edges thereof beveled; and an annular tread removably associated with the recess, said tread having its sides converging toward the inner periphery thereof, said tread being adapted to contract the bridge whereby the sides of the recess are forced toward the sides of the tread with said beveled edges engaging the converging side of the tread, the sides of the tread and the recess forming annular spaces in the recess, said bridge and tread having interlocking means whereby the tread is prevented from slipping on the bridge in the recess.

In testimony whereof we have signed our names to this specification in the presence of two subscribing witnesses.

SIMON A. SHERMAN.
JOHN STIVESON.

Witnesses:
WILLIAM M. STIVESON,
LAWRENCE WEAVER.